_United States Patent Office_

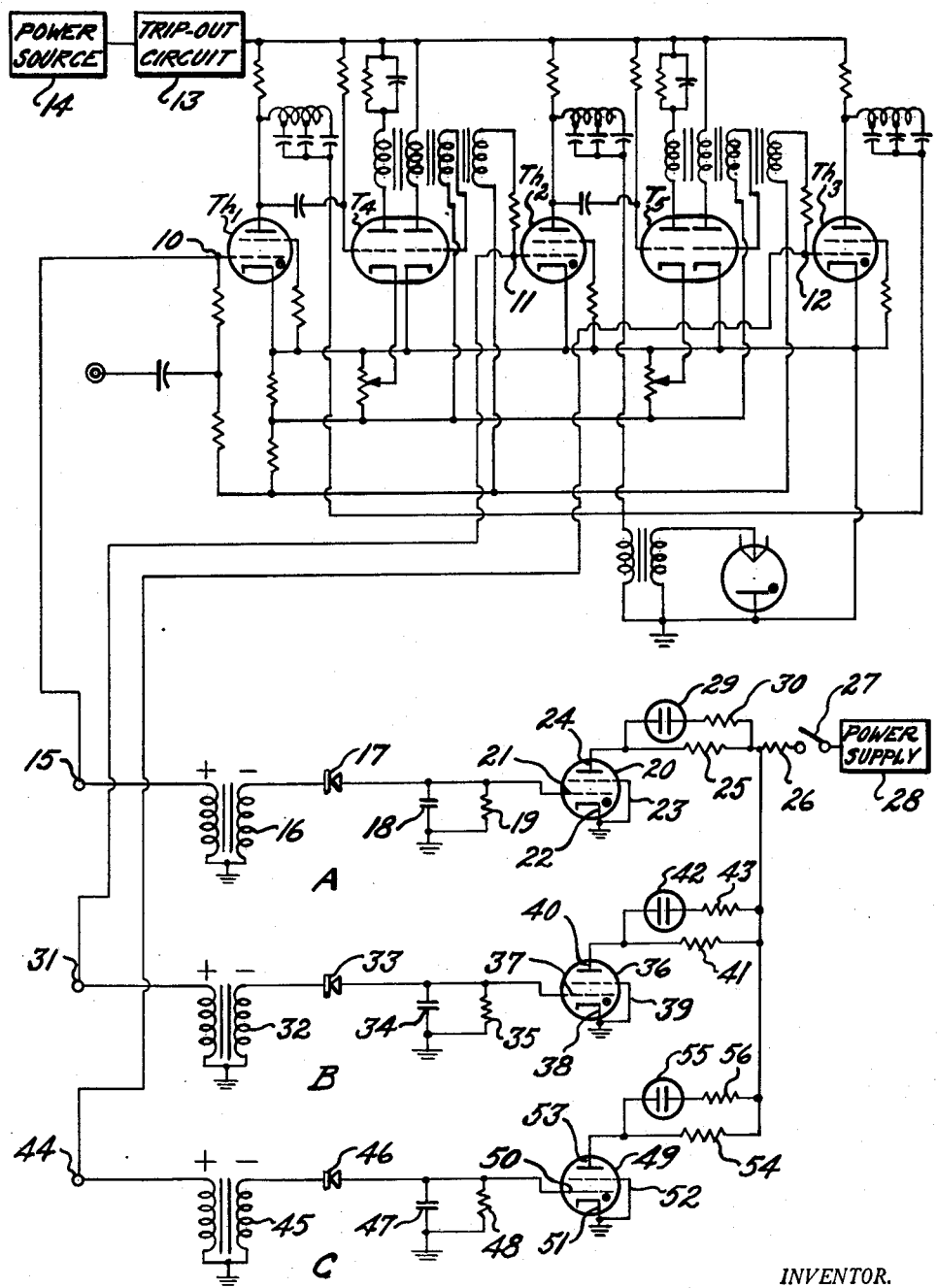

3,119,104
Patented Jan. 21, 1964

3,119,104
NETWORK COMPONENT FAILURE LOCATION
APPARATUS
Paul A. Bryan, Rickmyer Road, Rome, N.Y., assignor to the United States of America as represented by the Secretary of the Air Force
Filed Oct. 4, 1960, Ser. No. 60,529
1 Claim. (Cl. 340—248)
(Granted under Title 35, U.S. Code (1952), sec. 266)

The invention described herein may be manufactured and used by or for the United States Government for governmental purposes without payment to me of any royalty thereon.

The present invention relates to testing apparatus and more particularly to apparatus to locate and identify which one of a group of thyratron switching devices has arced through, said thyratron switching devices being incorporated in a line-type pulse modulator.

In the line-type pulse radar modulators, trip-out of the power source actuating the modulator is due usually to the arcing through of one of a group thyratron switch tubes incorporated therein. In the past, it has been difficult to determine easily, quickly and accurately which one of the aforementioned thyratron switch tubes caused the trip-out by reason of arc-through occurring therein. The present invention provides apparatus to determine, whether the modulator trip-out is due to thyratron switch tube arc-through and more particularly to identify which one of the group of thyratron switch tubes is arcing through.

In accordance with the present invention, when the trigger actuating pulse at the grid of one of the aforesaid thyratron switch tubes is removed due to a short circuit caused by arc-through within the thyratron tube, the hold-off bias voltage at the grid of a relay tube is removed in a period of time determined by the RC time constant of the said relay tube grid circuit. The relay tube circuit has a neon tube connected in parallel to the anode resistor of the relay tube and the neon tube illuminates when the aforesaid hold-off bias voltage is removed thus indicating that arc-through has occurred within the thyratron tube. The circuit or apparatus to indicate arc-through is shown and described in detail in my patent application entitled: "System for Locating Modulator Malfunctioning," filed at even date herewith, and having U.S. Patent Office application Serial No. 60,530, now Patent No. 3,095,557, issued June 25, 1963.

For each tube of the group of thyratron switch tubes there is provided a separate circuit as described above to indicate arc-through. However, each of the circuits operates from a common well regulated power supply. A resistor in series with a switch is inserted between the well regulated power supply and the aforementioned circuits to permit only one relay tube to conduct (that is the first one to lose hold-off bias voltage). The resultant supply voltage on the remaining relay tubes is below the ignition or conduction point because of the voltage drop occurring across the aforesaid inserted resistor. After correcting the thyratron switch tube at fault and with the modulator operating at normal power the arc-through indicator circuits are reset by the aforementioned inserted switch.

An object of the present invention is to provide an arc-through indicator circuit for each tube of a group of thyratron switch tubes wherein only one of the aforesaid circuits will identify the first of said switch tubes to arc-through.

Another object of the present invention is to provide an arc-through indicator circuit for each tube of a group of thyratron switch tubes wherein means are provided to identify the first of said switch tubes to arc-through.

Yet another object of the present invention is to provide indicating means to identify the first tube of a group of thyratron tubes to arc-through wherein said thyratron switch tubes are incorporated in a line-type pulse modulator.

The novel features that I consider characteristic of my invention are set forth with particularity in the appended claim. The invention itself, however, both as to its organization and its method of operation, together with additional objects and advantages thereof when read in connection with the accompanying drawing, in which there is shown a schematic diagram of a line-type pulse modulator having a group of thyratron switch tubes incorporated therein; and also including a schematic diagram of the arc-through indicator circuits associated with the group of thyratron switch tubes.

Now referring to the drawing, there is shown a conventional line-type pulse modulator which is shown and described on pages 485–488 of volume 5 of Radiation Laboratory Series, published in 1948 by McGraw-Hill Company, Inc. The switch tubes utilized therein are thyratrons $Th_1$, $Th_2$, and $Th_3$, respectively. A positive trigger pulse is applied to each of thyratrons $Th_1$, $Th_2$ and $Th_3$ at grid electrodes 10, 11, and 12, respectively. In the event that arc-through occurs in any of the above-identified thyratrons, a short circuit results therein and trip-out circuit 13 disconnects the modulator from its associated power source 14. However simple means are unavailable within the modulator to identify which one of the group of thyratrons is arcing through. Therefore the arc-through indicator circuits are incorporated with that of the switch tubes in order to identify and locate the faulty thyratron.

Now referring to the drawing, terminal 15 is connected to terminal 10. Terminal 31 is connected to terminal 11. Terminal 44 is connected to terminal 12 of FIGURE 1. The mode of operation for the circuit A is described since the circuits of B and C operate identically. There is shown electron discharge device 20 which may be a relay type tube such as the 2D21. Cathode 22 is connected to ground. Anode 24 is connected to well regulated power supply 28 by way of resistors 25, 26 and switch 27. It is to be noted that resistor 26, switch 27 and power supply 28 are common to the circuits shown in A, B and C. Neon tube 29 is in series with resistor 30 and the series combination is connected across resistor 25. Electron discharge device 20 is initially adjusted without positive pulses being applied to terminal 15 so that current will flow therein. As a result of the aforesaid current flow, neon tube 29 is illuminated.

During the operation of the modulator shown in the drawing, positive pulses are applied to grid 10 of thyratron $Th_1$ and simultaneously the identical pulses are applied to terminal 15. The positive pulses are obtained from an associated radar system. The positive pulses applied to terminal 15 are inverted by blocking oscillator transformer 16, a blocking oscillator transformer is utilized in this embodiment for pulse coupling purposes. The inverted pulses are fed through diode 17 and negatively charge capacitor 18. The combination of capacitor 18 and resistor 19 is selected to provide an average hold-off bias voltage at grid 21 of electron discharge device 20 sufficient to prevent conduction at the anode voltage used and at normal operating conditions. When electron discharge device 20 becomes non-conductive, neon tube 29 is no longer illuminated. When arc-through occurs in thyratron switch tube $Th_1$ of the drawing, there is a short circuit and the positive pulse applied thereto is by-passed to ground. Thereupon the identical positive pulse being applied to terminal 15 is also by-passed to ground and as a result thereof the hold-off bias voltage at grid 21 of electron discharge device 20 is removed. Electron discharge device 20 conducts and thereupon neon tube 29 is illuminated indicating arc-through in thyratron switch tube $Th_1$.

However as the three indicator circuits shown in A, B, and C respectively, have common resistor 26, switch 27 and power supply 28 then only neon tube 29 is illuminated because of aforesaid loss of the positive pulses. If thyratron switch tubes $Th_2$ or $Th_3$ arcs through there are indications thereof in neon tube 42 or 55 respectively as the first electron discharge device to conduct such as device 20 will result in a voltage drop across resistor 26 and the resultant anode supply voltage to electron discharge devices 36 and 49 will be below the ignition or conduction point for devices 36 and 49. After correcting the thyratron first located and indicated at fault and with the modulator operating at normal power the circuits of A, B, and C are reset by opening and the closing switch 27.

It is to be noted that trip-out circuit 13, which may be a conventional overload relay such as described at pages 433 to 435 of volume 5 of Radiation Laboratory Series published in 1948 by McGraw-Hill Books Company, Inc., is actuated to disconnect power source 14 from the modulator when arc-through is present in any one of thyratron switch tubes $Th_1$, $Th_2$, and $Th_3$, respectively. The combination of capacitor 18 and resistor 19 are selected so that their time constant is such that the hold-off bias level drops at a rate much faster than the trip-out operation.

Although I have shown and described certain specific embodiments of my invention, I am fully aware that many modifications thereof are possible. My invention, therefore, is not to be restricted except as insofar as is necessitated by the prior art and by the spirit of the appended claim.

I claim as my invention:

A network component failure location apparatus to indicate the malfunctioning of one of a multiplicity of thyratron switch tubes associated with a modulator having a separate power source, each of said thyratron switch tubes having a control grid receiving positive pulses from a radar system, said received positive pulses being bypassed to ground upon said malfunctioning comprising means to automatically disconnect said power source of said modulator upon the occurrence of said malfunctioning, an electron discharge device for each of said multiplicity of thyratron switch tubes, each of said electron discharge devices having an anode, a cathode, and a control grid, a common power supply for said electron discharge devices, each of said anodes of each of said electron discharge devices being interconnected to said common power supply by way of a first resistor, a second resistor and switch in series, said second resistor and switch being common to said anodes of said electron discharge devices, an ion discharge device for each of said electron discharge devices, each of said ion discharge devices being connected across said first resistor by way of a third resistor, said ion device only being illuminated during conduction in its associated electron discharge device, a pulse transformer associated with each of said thyratron switch tubes, each of said transformers having the input thereof connected to said control grid of its associated thyratron switch tube thereby receiving said positive pulses, said pulse transformer operating to invert said positive pulses, a diode for each of said transformers to receive the output pulses therefrom, a parallel combination of a resistor and capacitor associated with each of said diodes, each of said parallel combinations receiving the output from its associated diode and operating to provide an average hold off negative bias to each of said control grids of each of said electron discharge devices sufficient to prevent conduction therein during periods of reception of said positive pulses by said pulse transformer, the time constant of said parallel combination being selected to permit said ion device to illuminate prior to said disconnect operation upon said malfunctioning.

References Cited in the file of this patent

UNITED STATES PATENTS

| | | |
|---|---|---|
| 2,057,531 | Livingston | Oct. 13, 1936 |
| 2,130,411 | Bedford | Sept. 20, 1938 |
| 2,854,663 | Maynard | Sept. 30, 1958 |
| 2,934,642 | Numrich | Apr. 26, 1960 |
| 2,984,796 | Affelder | May 16, 1961 |

OTHER REFERENCES

Terman: Radio Engineers' Handbook, McGraw-Hill, 1943, pages 347 and 349.